US011906029B2

(12) United States Patent
Eck et al.

(10) Patent No.: US 11,906,029 B2
(45) Date of Patent: Feb. 20, 2024

(54) CONTINUOUSLY VARIABLE TRANSMISSION ENGINE BRAKING SYSTEM

(71) Applicant: TEAM Industries, Inc., Bagley, MN (US)

(72) Inventors: Brian George Eck, Bemidji, MN (US); Allen Lloyd Olson, Hines, MN (US)

(73) Assignee: TEAM Industries, Inc., Bagley, MN (US)

( * ) Notice: Subject to any disclaimer, the term of this patent is extended or adjusted under 35 U.S.C. 154(b) by 135 days.

(21) Appl. No.: 17/556,417

(22) Filed: Dec. 20, 2021

(65) Prior Publication Data

US 2022/0213958 A1 Jul. 7, 2022

Related U.S. Application Data

(60) Provisional application No. 63/225,688, filed on Jul. 26, 2021, provisional application No. 63/133,498, filed on Jan. 4, 2021.

(51) Int. Cl.
*F16H 55/56* (2006.01)
*F16H 61/21* (2006.01)

(52) U.S. Cl.
CPC ............. *F16H 55/56* (2013.01); *F16H 61/21* (2013.01)

(58) Field of Classification Search
CPC . F16H 55/66; F16H 9/18; F16H 61/21; F16H 55/52; F16H 55/563
See application file for complete search history.

(56) References Cited

U.S. PATENT DOCUMENTS

| | | | |
|---|---|---|---|
| 6,149,540 A | 11/2000 | Johnson et al. |
| 6,743,129 B1 | 6/2004 | Younggren et al. |
| 6,811,504 B2 | 11/2004 | Korenjak et al. |
| 7,072,754 B1 | 7/2006 | Sherrod |
| 7,674,197 B2 | 3/2010 | Aitcin |
| 8,272,981 B2 | 9/2012 | Galletti et al. |
| 8,534,413 B2 | 9/2013 | Nelson et al. |
| 8,651,986 B2 | 2/2014 | Ochab et al. |
| 8,668,623 B2 | 3/2014 | Vuksa et al. |

(Continued)

FOREIGN PATENT DOCUMENTS

| | | |
|---|---|---|
| CN | 101526126 A | 9/2009 |
| CN | 201407322 | 2/2010 |

(Continued)

*Primary Examiner* — Sherry L Estremsky
(74) *Attorney, Agent, or Firm* — Fogg & Powers LLC

(57) ABSTRACT

A drive sheave assembly of a continuously variable transmission is provided. A fixed sheave of the assembly includes a central recess. A plurality of sheave ramps are located within the central recess. A one-way engagement collar is configured to rotate freely on an end portion of a sleeve when the sleeve rotates in a first direction and lock onto rotation of the sleeve when the sleeve rotates in a second direction. The one-way engagement collar further has a plurality of ramp pockets. A ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of a belt when the sleeve rotates in the second direction.

20 Claims, 13 Drawing Sheets

(56) References Cited

U.S. PATENT DOCUMENTS

| | | | |
|---|---|---|---|
| 9,057,432 B1 | 6/2015 | Bouffard et al. | |
| 9,228,644 B2 | 1/2016 | Tsukamoto et al. | |
| 9,353,835 B2 | 5/2016 | Sekiya | |
| 9,797,485 B2 * | 10/2017 | Ebihara | F16H 63/062 |
| RE47,790 E | 12/2019 | Bult et al. | |
| RE47,798 E | 1/2020 | Tsukamoto et al. | |
| 10,641,366 B2 | 5/2020 | Kuhl et al. | |
| 2002/0032088 A1 | 3/2002 | Korenjak et al. | |
| 2003/0221890 A1 * | 12/2003 | Fecteau | F16H 55/56 |
| | | | 180/210 |
| 2015/0024882 A1 | 1/2015 | Ochab et al. | |
| 2015/0111674 A1 | 4/2015 | Yuan et al. | |
| 2020/0149615 A1 | 5/2020 | Kuhl et al. | |

FOREIGN PATENT DOCUMENTS

| | | |
|---|---|---|
| CN | 101526126 B | 12/2010 |
| CN | 103343786 A | 10/2013 |
| CN | 204300258 U | 4/2015 |
| CN | 106812897 A | 6/2017 |
| JP | 2004257458 A | 9/2004 |
| JP | 3160653 U | 7/2010 |
| JP | 2015001269 A | 1/2015 |

\* cited by examiner

CONTINUOUSLY VARIABLE TRANSMISSION ENGINE BRAKING SYSTEM

CROSS-REFERENCE TO RELATED APPLICATIONS

This Application claims priority to U.S. Provisional Application Ser. No. 63/133,498, same title herewith, filed on Jan. 4, 2021, and to U.S. Provisional Application Ser. No. 63/225,688, same title herewith, filed on Jul. 26, 2021, which both are incorporated in their entirety herein by reference.

BACKGROUND

Continuously variable transmissions (CVTs) provide a transmission system that automatically adjusts its gearing as needed. A typical CVT includes a drive sheave assembly and a driven sheave assembly. The drive sheave assembly is in operational communication with an engine and the driven sheave assembly is in operation a communication with a drivetrain of a vehicle. A belt provides operational communication between the drive sheave assembly and the driven sheave assembly. Each sheave assembly typically includes a fixed sheave and a movable sheave that are mounted on a post. A movable sheave activation assembly moves the movable sheave in relation to the fixed sheave to adjust a location of the belt in relation to a central axis of the sheave assembly to change the gearing by selectively causing the belt to ride up and down on engagement surfaces of the fixed and moveable sheaves.

Engine braking is a desired feature to help slow down a vehicle in certain situations. For example, if a vehicle is traveling down a steep hill, traditional braking systems to slow the vehicle may not be adequate. Engine braking is expressly desired in vehicles that are subject to extreme terrain such as, but not limited to, all-terrain vehicles (ATVs) and utility terrain vehicles (UTVs). Providing an engine braking system that includes a CVT can be a challenge since, during a typical engine braking situation, the fixed sheave and the moveable sheave of the drive sheave assembly are spaced away from each other with only an inner surface of the belt engaging a sleeve that is free to rotate on the post (to achieve an idle condition). A reliable efficient engine braking system for a CVT is desired. Further, it may be desired to have an engine braking system in a CVT that disengages when a certain threshold is reached to protect vehicle components.

SUMMARY OF INVENTION

The following summary is made by way of example and not by way of limitation. It is merely provided to aid the reader in understanding some of the aspects of the subject matter described. Embodiments provide a drive sheave assembly with an engine braking feature that includes a one-way engagement collar that is selectively received within a central recess of a fixed sheave.

In one embodiment, a drive sheave assembly of a continuously variable transmission is provided. The drive sheave assembly includes a post, a fixed sheave, a movable sheave, a sleeve, a one-way engagement collar and ramp members. The fixed sheave is statically mounted on the fixed post and includes a central recess. The fixed sheave further includes a plurality of sheave ramps within the central recess. The movable sheave is slidably mounted on the fixed post. The sleeve is rotatably mounted on the post. A mid-portion of the sleeve is positioned between the fixed sheave and the movable sheave and has an outer surface configured to engage an inner surface of a belt. A one-way engagement collar is mounted over an end portion of the sleeve. The one-way engagement collar is configured to rotate freely on the end portion of the sleeve when the sleeve rotates in a first direction and lock onto rotation of the sleeve when the sleeve rotates in a second direction. The one-way engagement collar further has a plurality of ramp pockets that extend axially in from an end surface of the one-way engagement collar. A ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

In another embodiment, a drive sheave assembly of a continuously variable transmission is provided. The drive sheave assembly includes a post, a fixed sheave, a movable sheave, a sleeve, a one-way engagement collar, a plurality of pairs of locking rollers and roller biasing members, and ramp members. The fixed sheave is statically mounted on the fixed post. The fixed sheave includes a central recess. The fixed sheave further includes a plurality of sheave ramps within the central recess. The movable sheave is slidably mounted on the fixed post. The sleeve is rotatably mounted on the post. A mid-portion of the sleeve is positioned between the fixed sheave and the movable sheave. The mid-portion of the sleeve includes an outer surface configured engage an inner surface of a belt. The one-way engagement collar mounted over an end portion of the sleeve. The one-way engagement collar has a plurality of locking pockets extending axially in from a side edge of the one-way engagement collar. The one-way engagement collar including a plurality of roller windows. Each roller window extending radially from an inside surface of the one-way engagement collar into an associated locking pocket. The one-way engagement collar further having a plurality of ramp pockets that extend axially in from an end surface of the one-way engagement collar. Each pair of locking roller and roller biasing member of the plurality of the locking rollers and roller biasing members received in an associated locking pocket of the one-way engagement collar. A portion of each locking roller extends through an associated roller window of the one-way engagement collar to engage the portion of the sleeve. Each locking pocket and associated pair of locking roller and roller biasing member being configured to allow rotation of the one-way engagement collar on the end portion of the sleeve when the sleeve rotates in a first direction and lock rotation of the one-way engagement collar onto the rotation of the sleeve when the sleeve rotates in a second direction. The ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

In yet another embodiment, a vehicle that includes a drivetrain, an engine, and a continuously variable transmission is provided. The continuously variable transmission is in operational communication between the drivetrain and the engine to couple torque between the engine and the drivetrain. The continuously variable transmission includes at least one sheave assembly. The at least one sheave assembly further includes a post a fixed sheave, a movable sheave, a sleeve, a one-way engagement collar, and ramp members. The fixed sheave is statically mounted on the fixed post. The fixed sheave includes a central recess. A plurality of sheave ramps are located within the central recess. The movable sheave is slidably mounted on the fixed post. The sleeve is rotatably mounted on the post. A mid-portion of the sleeve is positioned between the fixed sheave and the movable sheave. The mid-portion of the sleeve has an outer surface that is configured to engage an inner surface of a belt. The one-way engagement collar is mounted over an end portion of the sleeve. The one-way engagement collar is configured to rotate freely on the end portion of the sleeve when the sleeve rotates in a first direction and lock onto rotation of the sleeve when the sleeve rotates in a second direction. The one-way engagement collar further has a plurality of ramp pockets that extend axially in from an end surface of the one-way engagement collar. The ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

BRIEF DESCRIPTION OF THE DRAWINGS

Embodiments can be more easily understood and further advantages and uses thereof will be more readily apparent, when considered in view of the detailed description and the following figures in which.

In accordance with common practice, the various described features are not drawn to scale but are drawn to emphasize specific features relevant to the subject matter described. Reference characters denote like elements throughout Figures and text.

DETAILED DESCRIPTION

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a CVT with an engine braking system (EBS) (CVT EBS) that implements a one-way engagement collar to selectively engage a portion of a belt during an engine braking situation to clamp down on the belt with an associated sheave assembly. Some embodiments are further configured to disengage the engine braking feature when a threshold is reached to protect vehicle components.

Figure 1A:
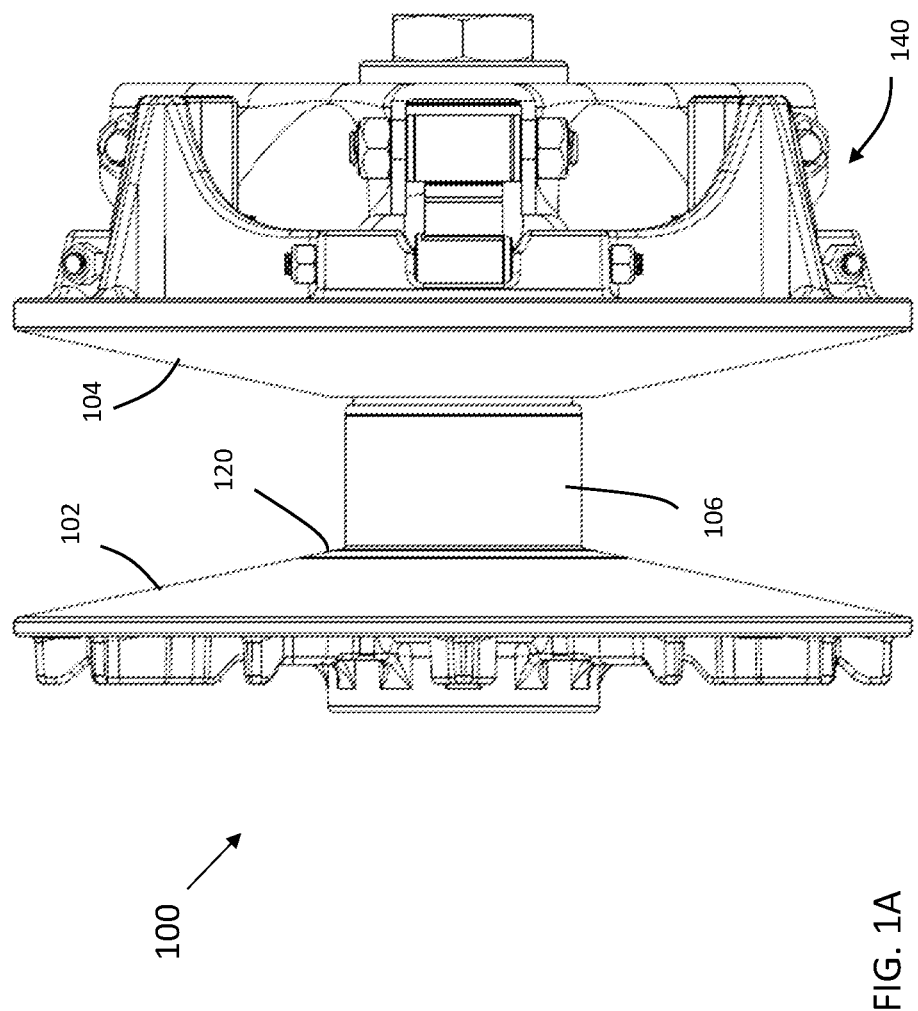
FIG. 1A is a side view of a drive sheave assembly of a CVT with an engine braking system in an inactivated configuration according to one exemplary embodiment.
Figure 1B:
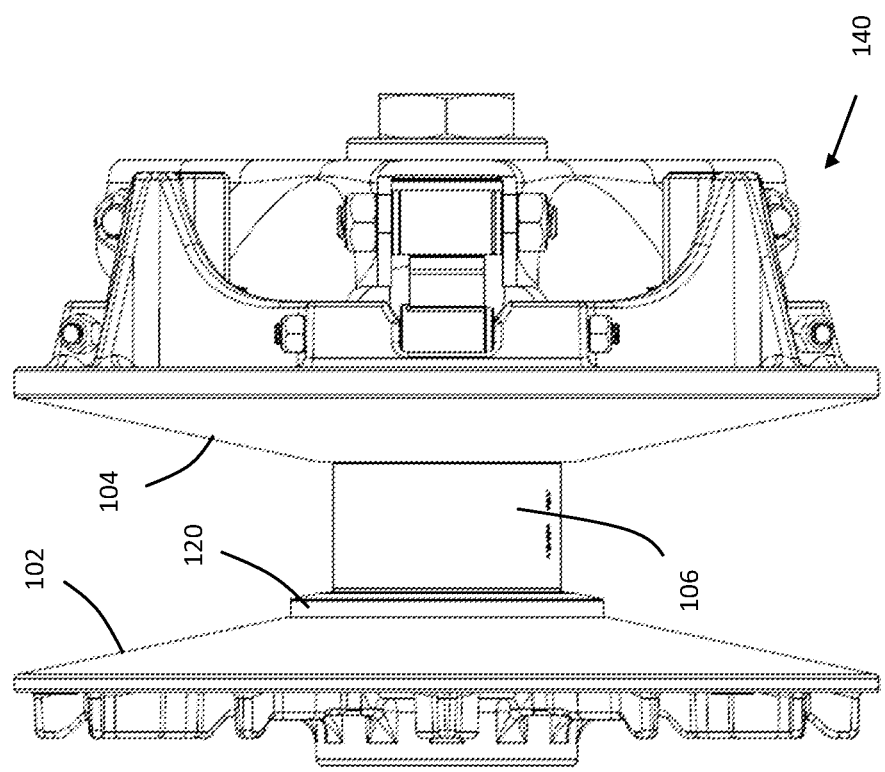
FIG. 1B is a side view of the drive sheave of a CVT of FIG. 1A with the engine braking system in an activated configuration according to one exemplary embodiment.

Referring to FIGS. 1A and 1B side views of a drive sheave assembly 100 of a CVT EBS of an example embodiment is illustrated. The drive sheave assembly 100 is part of a CVT such as CVT 304 discussed below. The drive sheave assembly 100 (or drive clutch assembly) includes a fixed sheave 102 and a movable sheave 104. The movable sheave 104 is configured to move axially in relation to the fixed sheave 102 under control of a movable sheave activation assembly 140. In one embodiment, the axial location of the movable sheave 104 on a post of the drive sheave assembly 100 is based off centrifugal forces the drive sheave assembly is experiencing due to rotation of the drive sheave assembly 100. The drive sheave assembly 100 includes a one-way engagement collar 120 which is in a retracted configuration in FIG. 1A. FIG. 1B illustrates the one-way engagement collar 120 in a belt engaging configuration which would occur during an engine braking situation.

Figure 2:
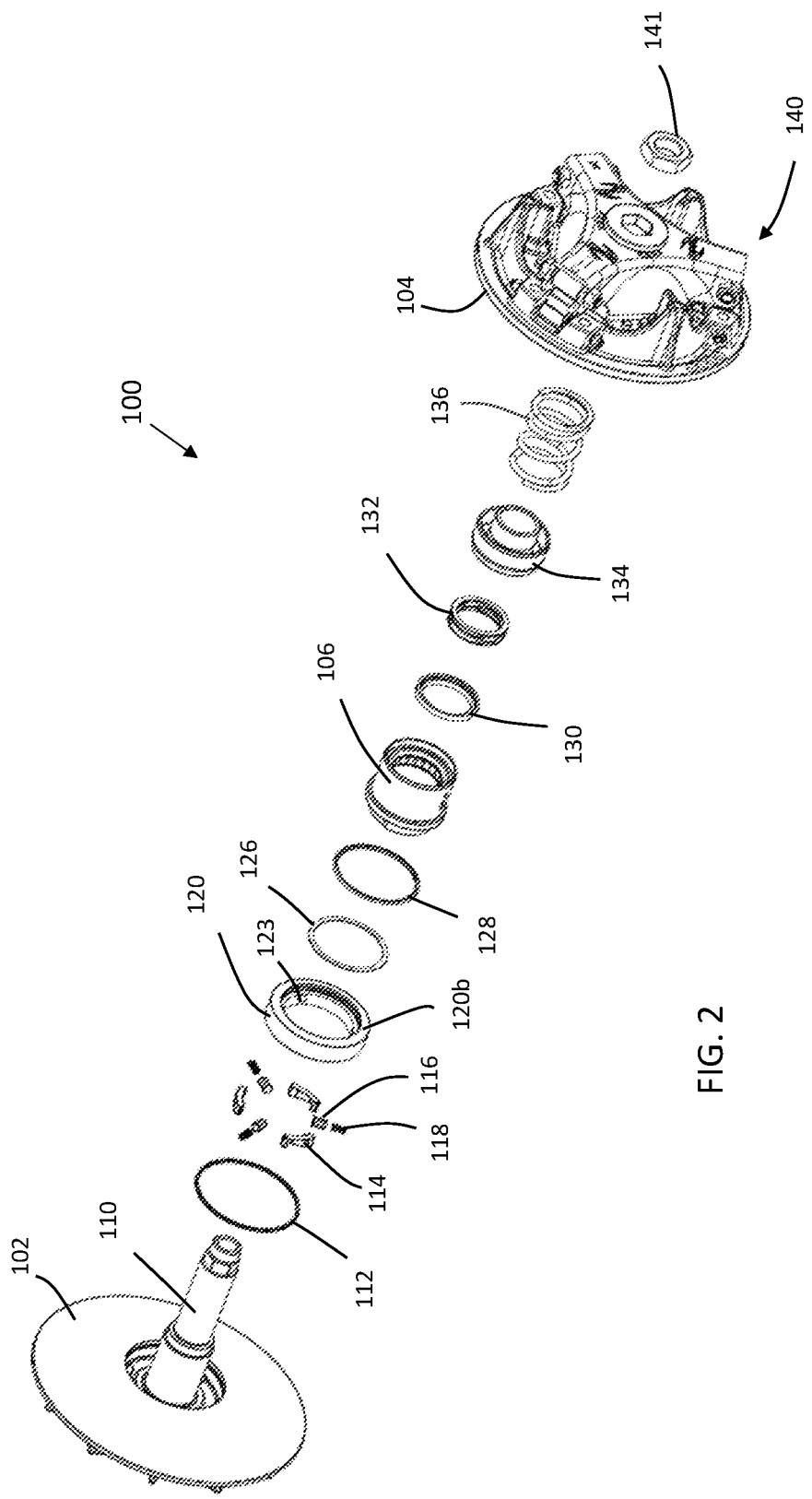
FIG. 2 is an unassembled view of the drive sheave assembly of FIG. 1A.

An unassembled view of the drive sheave assembly 100 is illustrated in FIG. 2. As illustrated, the drive sheave assembly 100 includes the fixed (or stationary) sheave 102 that is statically mounted on a post 110. The drive sheave assembly 100 further includes seals 112 and 128, thrust washers 126 and 130, bias members 132 and 136, spring cup 134 and nut 141. Further illustrated are ramp members 114, bullets 116 (caps) and bias members 118 that work with the one-way engagement collar 120 to selectively activate (move axially) the one-way engagement collar 120 to engage a belt 200 (shown in FIG. 7A) of the CVT. The movable sheave activation assembly 140 includes a main bias member 136.

Figure 3:
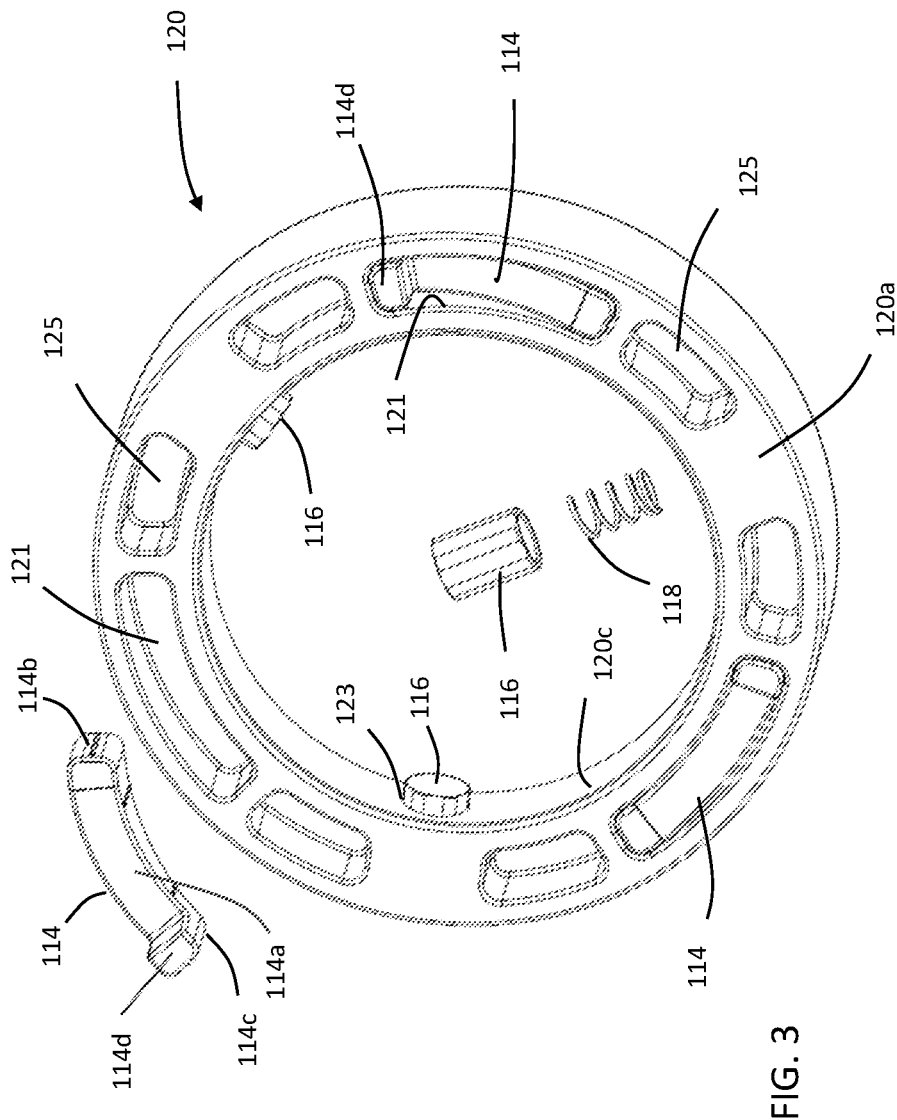
FIG. 3 is an end perspective view of a one-way engagement collar according to one exemplary embodiment.

FIG. 3 illustrates a closeup side perspective view of the one-way engagement collar 120, ramp members 114, bullets 116 and bullet bias members 118 (springs). Each ramp member 114 includes a ramped surface 114a which extends between a first end 114b to a ramp stop portion 114d at a second end 114c. The one-way engagement collar 120 is generally ring shaped with a central opening having a first end surface 120a and second end surface 120b (best illustrated in FIG. 2). The one-way engagement collar 120 includes spaced ramp pockets 121 that extend into the first end surface 120a of the one-way engagement collar 120. Each ramp member 114 is received with an associated end ramp pocket 121 such that the ramp surface 114a of each ramp 114 is facing outward from the one-way engagement collar 120.

The one-way engagement collar 120 further includes a plurality of bullet pockets 123 that radially extend into the one-way engagement collar 120 from an interior surface 120c of the one-way engagement collar 120. Each bullet 116 and bullet bias member 118 is received within an associated bullet pocket 123 in the one-way engagement collar 120. The one-way engagement collar 120 may further include a plurality of spaced voids 125, which in one example, is used to reduce the overall weight of the one-way engagement collar 120.

Figure 4:
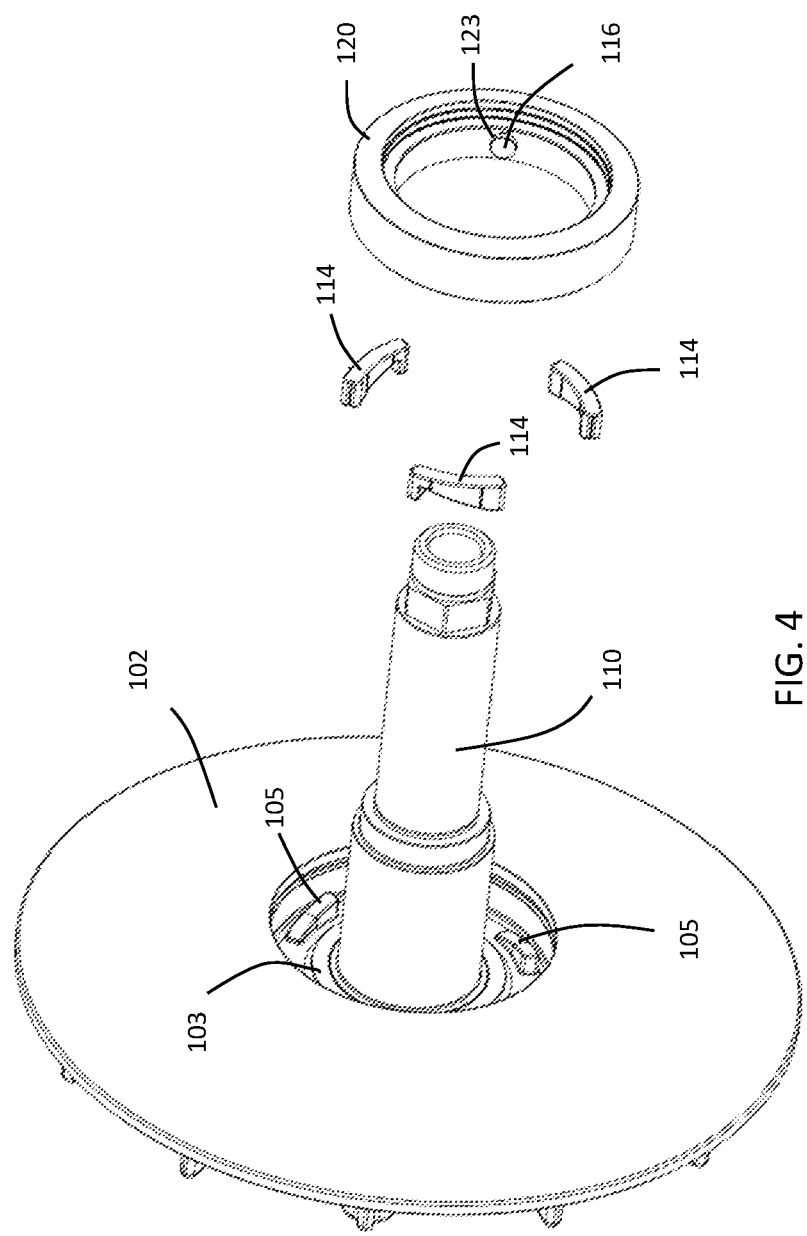
FIG. 4 is a side perspective view of a fixed sheave and the one-way engagement collar according to one exemplary embodiment.

FIG. 4 illustrates that the fixed sheave 102 includes a central recess 103 in this example embodiment. Within the central recess 103 is located sheave ramps 105. Each sheave ramp 105 is positioned to engage a ramped surface 114a of an associated ramp member 114. The sheave ramp/ramp member arrangement is configured to selectively move the one-way engagement collar 120 axially as discussed below in detail. FIG. 4 also illustrates a bullet 116 received within an associated bullet pocket 123 in the one-way engagement collar 120.

Figure 5:
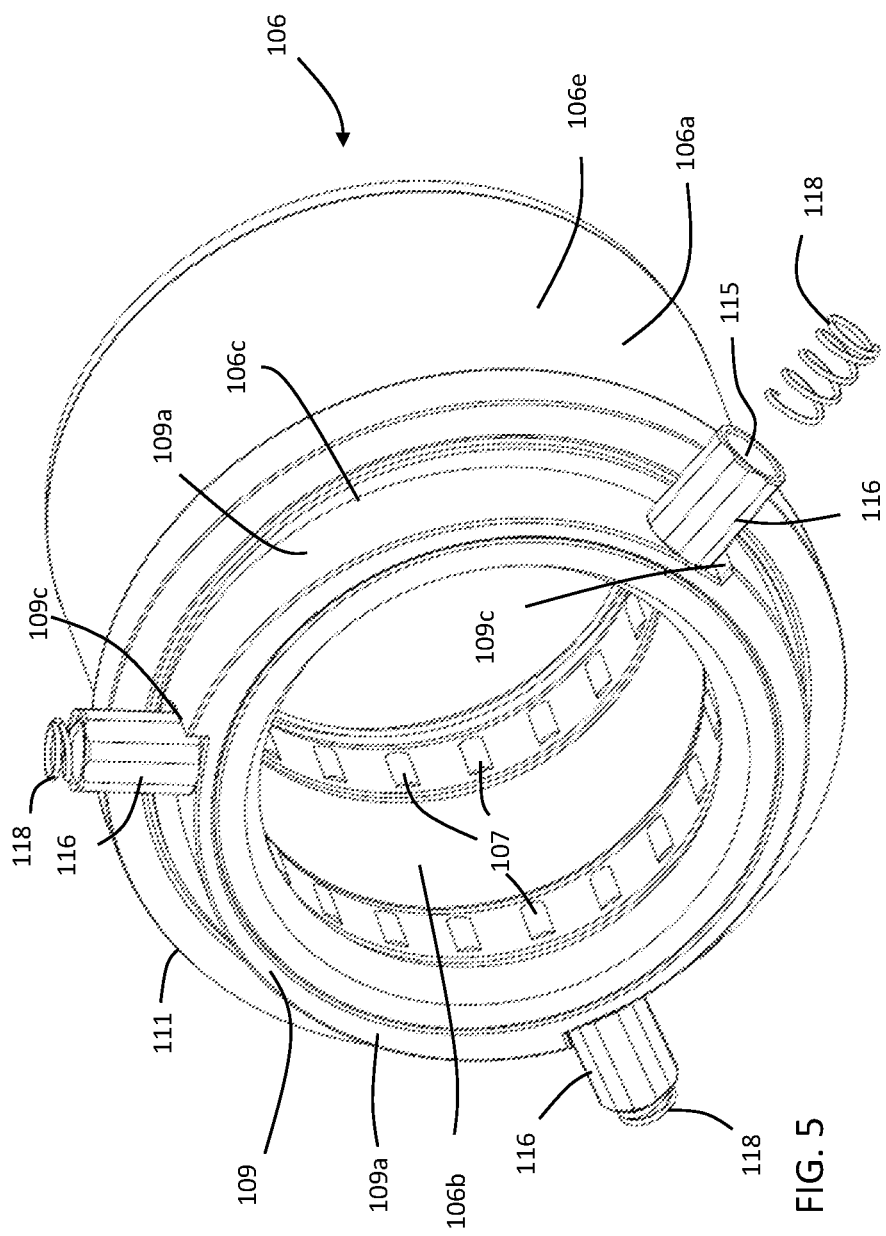
FIG. 5 is an end perspective view of a sleeve according to one exemplary embodiment.
Figure 6A:
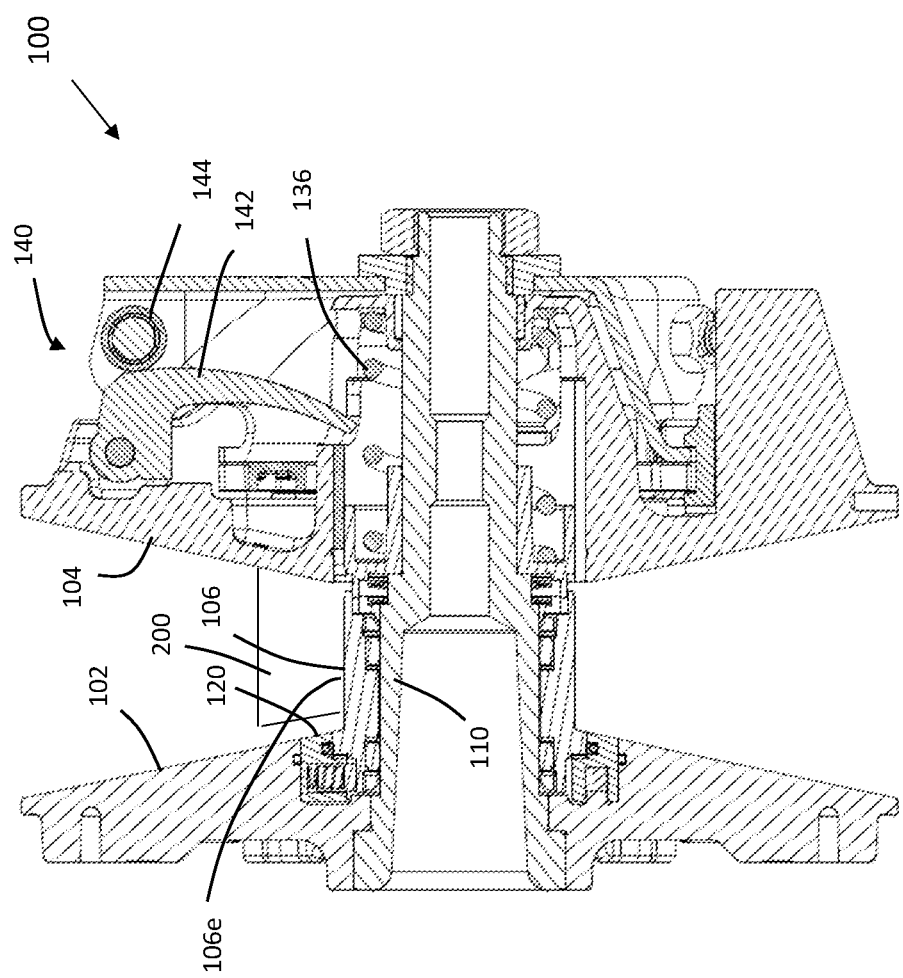
FIG. 6A is a cross-sectional side view of the drive sheave assembly of FIG. 1A with the engine braking system in the inactivated configuration.

Referring to FIG. 5, a close-up side view of the sleeve 106 and how the bullets 116 interact with the sleeve is illustrated. The sleeve 106 in one embodiment is an idler bearing that includes bearings 107 that are position partially within an inner surface 106b of the sleeve 106 to engage the post 110. A mid-portion 106e of the sleeve 106 includes an outer surface 106a that engages an inner surface of belt of the CVT (shown in FIG. 6A). An end portion 106c of the sleeve 106 includes a sleeve ramp portion 109 in this example. A ridge portion 111 separates the end portion 106c from the mid-portion 106e. As illustrated in FIG. 6A the mid-portion is positioned between the fixed sheave 102 and the movable sheave 104.

The sleeve ramp portion 109 includes a plurality of sleeve ramps 109a, Each of the radially positioned sleeve ramp 109a terminates with a sleeve ramp stop 109c which starts the next sleeve ramp 109a, As illustrated, the bullets 116, biased by the associated bullet bias members 118 that are received within bullet bores 115 of the bullets 116, ride along the ramps 109a of the sleeve ramp portion 109. When the sleeve 106 rotates in a first direction, the bullets 116 simply ride over the ramps 109a with the bullet bias members 118 forcing the bullets 116 to engage the surfaces of ramps 109a even as they pass over the sleeve ramp stops 109c (i.e., they snap over the sleeve ramp stops 109c when the sleeve rotates in the first direction). When the sleeve 106 rotates in the other direction (second direction), such as when a drivetrain is overrunning the rotation provided by the engine, the bullets 116 engaging the sleeve ramp stops 109c lock rotation of the one-way engagement collar 120 (which houses the bullets 116) with rotation of the sleeve 106.

FIG. 6A illustrates a cross-sectional side view of the drive sheave assembly 100. As illustrated, the movable sheave activation assembly 140 in this embodiment includes the main bias member 136, which in this embodiment is a compression spring, and a plurality of fly weights 142 and associated stationary members 144. The main bias member 136, positioned between the spring cup 134 and a portion of the movable sheave activation assembly 140, exerts a force on the movable sheave 104 away from the fixed sheave 102. This condition may occur at vehicle idle where the sleeve 106 rotates freely on the post 110 in the first direction of the drive sheave assembly 100 and no torque if transferred to the belt 200. As the rotational speed of the drive sheave assembly increases, such as when a vehicle throttle is increases, the fly weights 142 engaging the stationary members 144 counter the main bias member force causing the movable sheave 104 towards the fixed sheave 102. This action results in the belt 200 being clamped between the fixed and movable sheaves 102 and 104 therein coupling torque between the sheaves 102 and 104 and the belt 200. As the speed of the drive sheave assembly increases and decreases, the belt moves up and down engagement surfaces the fixed and movable sheaves 102 and 104 therein changing gearing by changing the distance of the belt 200 from a central axis of the drive sheave assembly 100. Further, as the rotational speed of the drive sheave assembly 100 decreases the bias force from the main bias member 136 overcomes the force of the flyweight/stationary member 144 arrangement and the belt rides back down towards the sleeve 106.

FIG. 6A illustrates the drive sheave assembly 100 in an operating configuration where engine braking is not needed. This operating configuration may occur when a vehicle is idling while on relatively even terrain. In this configuration, belt 200 has an inner surface that rides on the outer surface 106a of the sleeve 106. Only a portion of the belt 200 is illustrated in FIG. 6A. Since the sleeve 106 is free to rotate in a first direction in relation to the post 110, no torque from the drive sheave assembly 100 is coupled to the belt 200 in this idle configuration.

Figure 6B:
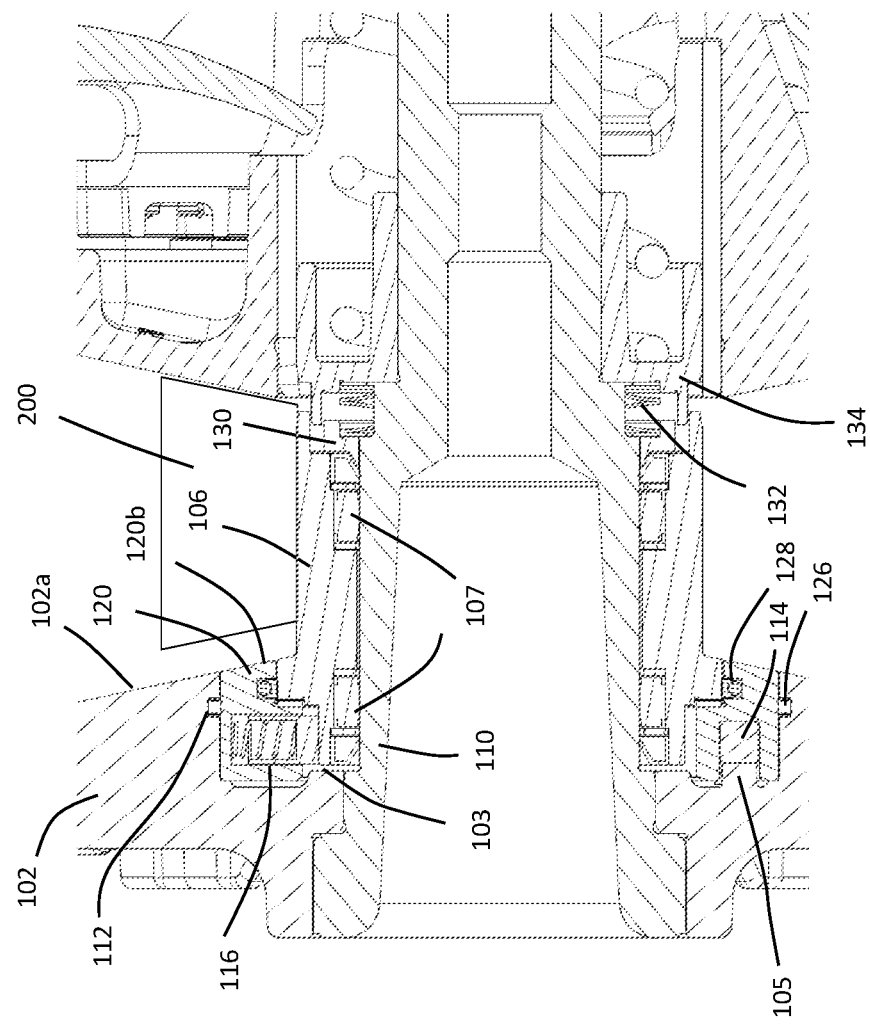
FIG. 6B is a close-up partial cross-sectional side view of the drive sheave assembly of FIG. 6A illustrating the engine braking system in the inactivated configuration.

FIG. 6B illustrates a close-up illustration of the engine braking assembly in the idle operation configuration. As illustrated, the one-way engagement collar 120 is received within the central recess 103 (or cavity) of the fixed sheave 102 with the second end 120b (or engaging end surface 120b) of the one-way engagement collar 120 being flush with a conical faced engaging surface 102a of the fixed sheave 102. Since the sleeve 106 is rotating in the first direction in this idle configuration, the bullets 116 are sliding over the sleeve ramps 109a of the sleeve ramp portion of the sleeve 106 allow rotation between the one-way engagement collar 120 and the sleeve 106.

Also illustrated in FIG. 6B is the position of seal 112 in a groove in a surface of the central recess 103 of the fixed sheave 102. In one example embodiment, the seal 112 is an O-ring seal. Further in an embodiment, the seal is a quad ring seal. Also illustrated is the position of seal 128 in an inside groove in the inner surface of the one-way engagement collar 120. In one embodiment the seal is a Teflon™ PTFE seal with or without an O-ring energizer. The seals 112 and 128 are positioned to prevent debris, such as belt debris, from getting to the ramped features (bullet/sleeve ramp and ramp member/sheave ramp features). Also illustrated in FIG. 6B is the positioning of bias member 132 (engine braking bias member) between the thrust washer 130 and another side of the spring cup 134. Bias member 132 in this embodiment is a compression wave spring 132. The function of bias member 132 is to exert a force on the sleeve/one-way engagement collar assembly to retain the one-way engagement collar 120 within the central recess 103 of the fixed sheave 102 when an engine braking condition is not present.

Figure 7A:
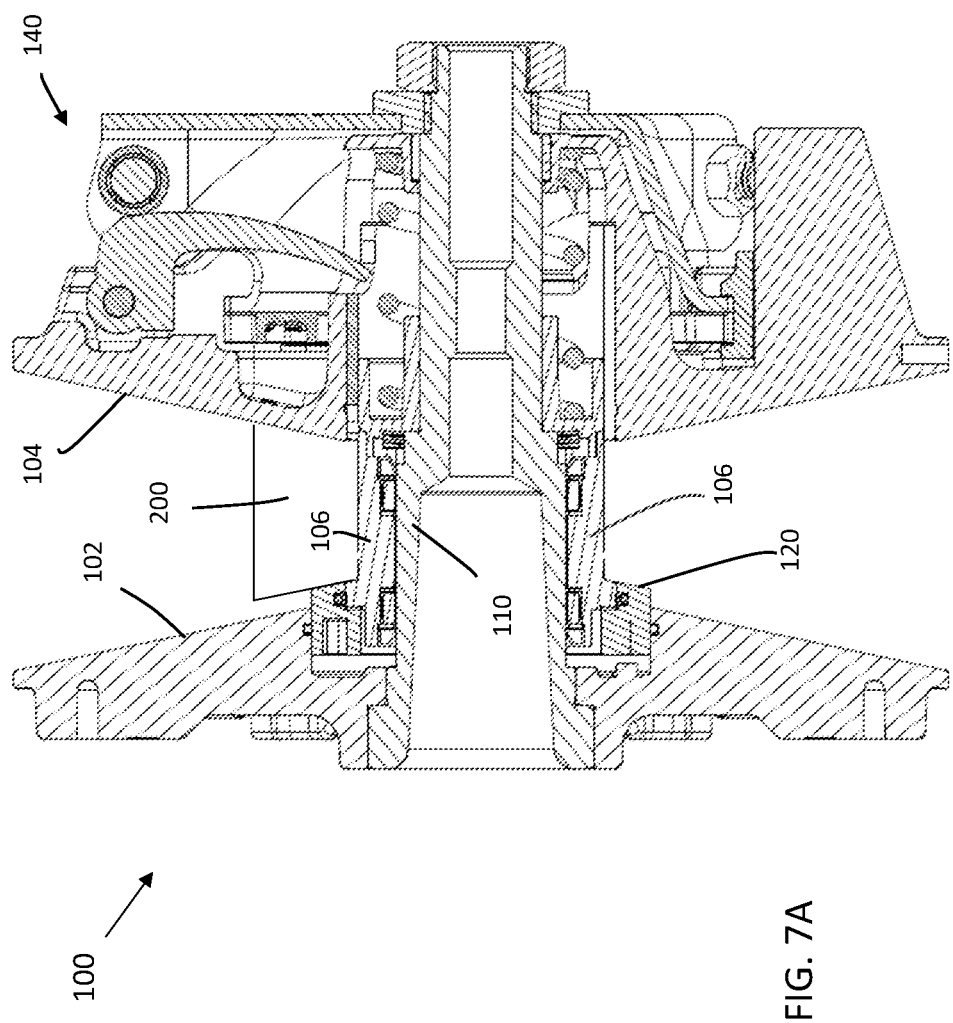
FIG. 7A is a cross-sectional side view of the drive sheave assembly of FIG. 1B with the engine braking system in the activated configuration.
Figure 7B:
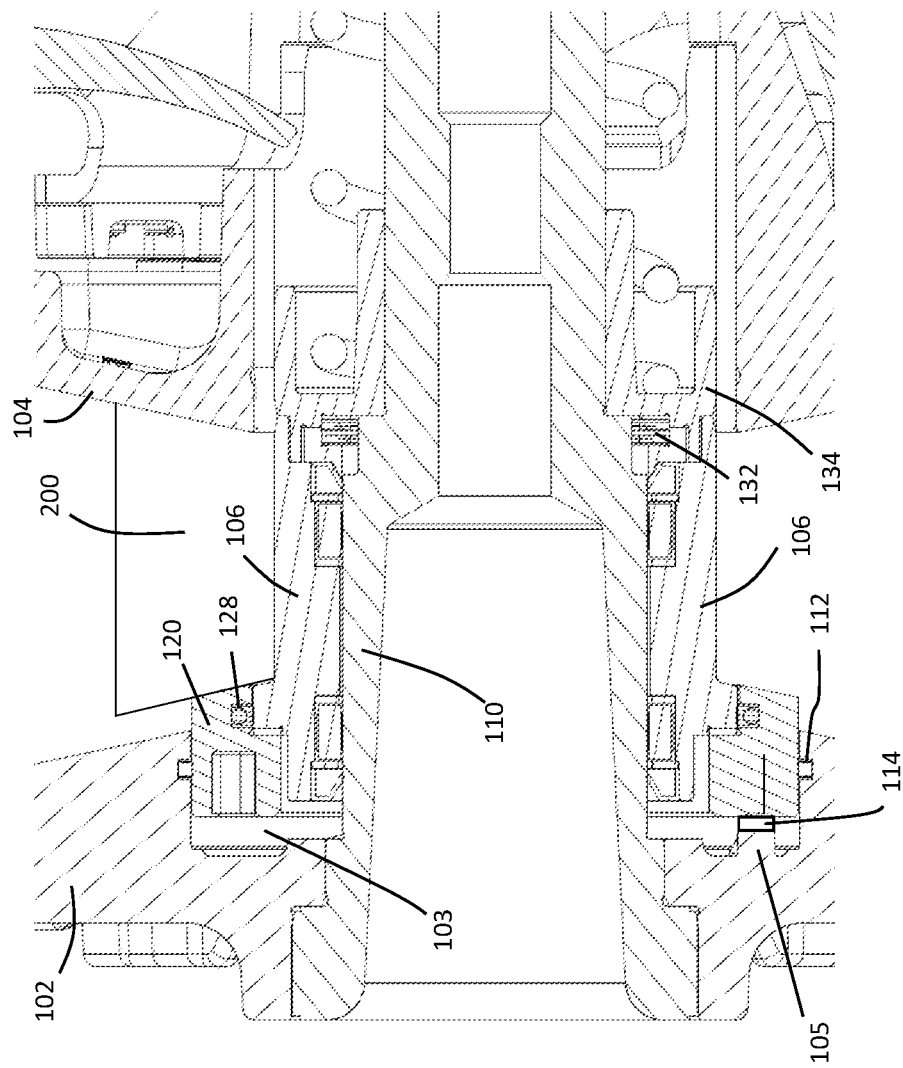
FIG. 7B is a close-up partial cross-sectional side view of the drive sheave assembly of FIG. 7A illustrating the engine braking system in the activated configuration.

FIG. 7A illustrates a side view of the drive sheave assembly 100 in an engine braking configuration. In this configuration, the one-way engagement collar 120 moves out from the central recess 103 of the fixed sheave 102 to engage a side portion of the belt 200. This action causes the drive sheave assembly 100 (the one-way engagement collar 120 and the movable sheave 104) to clamp down on the belt 200 therein coupling torque between a drivetrain of a vehicle and the engine to allow engine braking to occur. FIG. 7B illustrates a close-up view of the engine braking assembly during the engine braking condition.

As discussed above, engine braking occurs when a vehicle's drivetrain causes the belt 200 to overrun the sleeve (move the sleeve in an opposite or second direction). This can occur, for example, when the vehicle is at idle while going down a steep hill. In this situation, the belt 200, which rides on the sleeve during idle, rotates the sleeve 106 in an opposite direction (second rotational direction) from its normal direction (first rotational direction) provided by a rotational output of the engine. Rotation of sleeve 106 in the second direction causes the bullets 116 in the one-way engagement collar 120 to engage the sleeve ramp stops 109c on the sleeve ramp portion 109 of the sleeve 106 therein locking rotation of the one-way engagement collar 120 with rotation of the sleeve 106. This causes each ramp member 114 housed within the ramp pockets 121 of the one-way engagement collar to move in relation to the ramp members associated sheave ramp 105 in the central recess 103 of the fixed sheave 102 therein moving the one-way engagement collar out of the central recess 103 to engage the belt 200. This clamps the belt 200 between an engagement surface of the one-way engagement collar 120 and an engagement surface of the moveable sheave 104 therein coupling torque between the drive sheave assembly 100 and the belt 200.

One feature of the engine braking assembly is that the function of the engine braking can be disconnected under certain conditions even when the drivetrain is overrunning the sleeve 106. This may be desired to protect the vehicle components during extreme conditions. This feature is accomplished with the configuration of the one-way feature in the one-way engagement collar 120. The bullet bias members 118 within the cavity of the bullets 116 may be selected to exert a select mount of bias force to engage the sleeve ramps 109a and sleeve ramp stops 109c of the sleeve ramp portion 109 of the sleeve 106. The bias force may be selected so that a predetermined amount of centrifugal force caused by rotation of one-way engagement collar 120 counters the bias force provided by the bullet bias members 118. This causes the bullets 116 to move back into their associated bullet pockets 123 in the one-way engagement collar 120. When this happens, the bullets 116 no longer engage the sleeve ramp stops 109c of the sleeve ramps 109a of the sleeve 106. The one-way engagement collar 120 is then again free to rotate in relation to the sleeve 106. This allows each ramp member 114 housed within the ramp pockets 121 of the one-way engagement collar 120 to move in relation to the ramp members associated sheave ramp 105 in the central recess 103 of the fixed sheave 102 aided by bias member 132 (which may be a wave spring) therein moving the one-way engagement collar into the central recess 103 away from the belt 200. Once the centrifugal force lessens, the bias force from the bullet bias members 118 overcomes the centrifugal force and the bullets 116 once again extend out from there associated bullet pockets 123 to engage the sleeve ramp stops 109c to enact the engine braking by axially moving the one-way engagement collar 120 to engage a portion of the belt 200.

Figure 8:
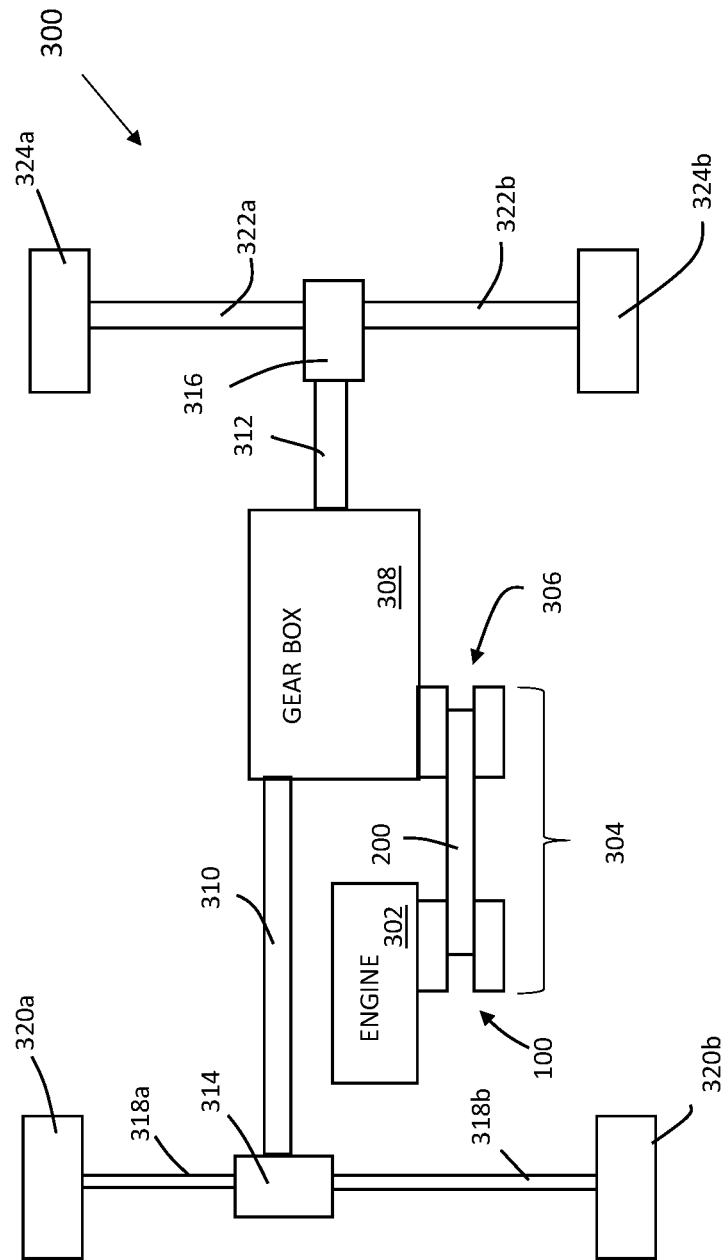
FIG. 8 is a block diagram of vehicle that includes the drive sheave assembly of FIG. 1A according to one exemplary embodiment.

Referring to block diagram of FIG. 8, an example vehicle 300 implementing a drive sheave assembly 100 is illustrated. The drive sheave assembly 100 is part of a CVT 304 that further includes the belt 200 (or endless looped member) and a driven sheave assembly 306. The drive sheave assembly 100 is in operational communication with an engine 302. The driven sheave assembly 306 is in operational communication with the drive sheave assembly 100 via the belt 200 to selectively communicate torque between the drive sheave assembly 100 and the driven sheave assembly 306.

The driven sheave assembly 306 is in communication with the drivetrain that, in this example, includes a gear box 308, a front and rear drive shaft 310 and 312 (or prop shafts), front and rear differentials 314 and 316, front half shafts 318a and 318b, rear half shafts 322a and 322b, front wheels 320a and 320b and rear wheels 324a and 324b.

As discussed above, an engine braking system that includes the one-way engagement collar 120 is activated when torque from the drivetrain communicated through the driven sheave assembly 306 and belt 200 to the drive sheave assembly 100 tries to overrun the sleeve 106 (move the sleeve in the second direction). This may occur when the engine 302 is at idle while the vehicle 300 is traveling down a hill. This overrunning of the sleeve 106 causes the bullets 116, within the bullet pockets 123 of the one-way engaging collar 120, to engage the sleeve ramp stops 109c of the sleeve 106 therein locking rotation of the one-way engagement collar 120 with the sleeve 106. As the one-way engagement collar 120 is overrunning (rotating with the sleeve 106), the ramp members 114 in the ramp pockets 121 slide on the sheave ramps 105 which axially moves the one-way engagement collar 120 to engage a side portion of the belt 200. This causes the drive sheave assembly 100 to clamp down on the belt 200 coupling torque between the belt and the engine 302 to the enable engine braking. When the belt 200 is no longer overrunning the sleeve 106 (rotating in the second direction), which will occur when the engine revolutions increase or when the terrain pitch the vehicle is encountering has been reduced, the engine braking system is disengaged. Further, as discussed above, the engine braking system may be designed to disengage when an overrunning torque reaches a predefined threshold to protect components of the vehicle 300. Although, FIG. 8 illustrates a continuously variable transmission engine braking system being used in a vehicle with wheels, other types of vehicles using a CVT such as, but not limited, vehicles that use one or more tracks may implement the continuously variable transmission engine braking system.

Figure 9:
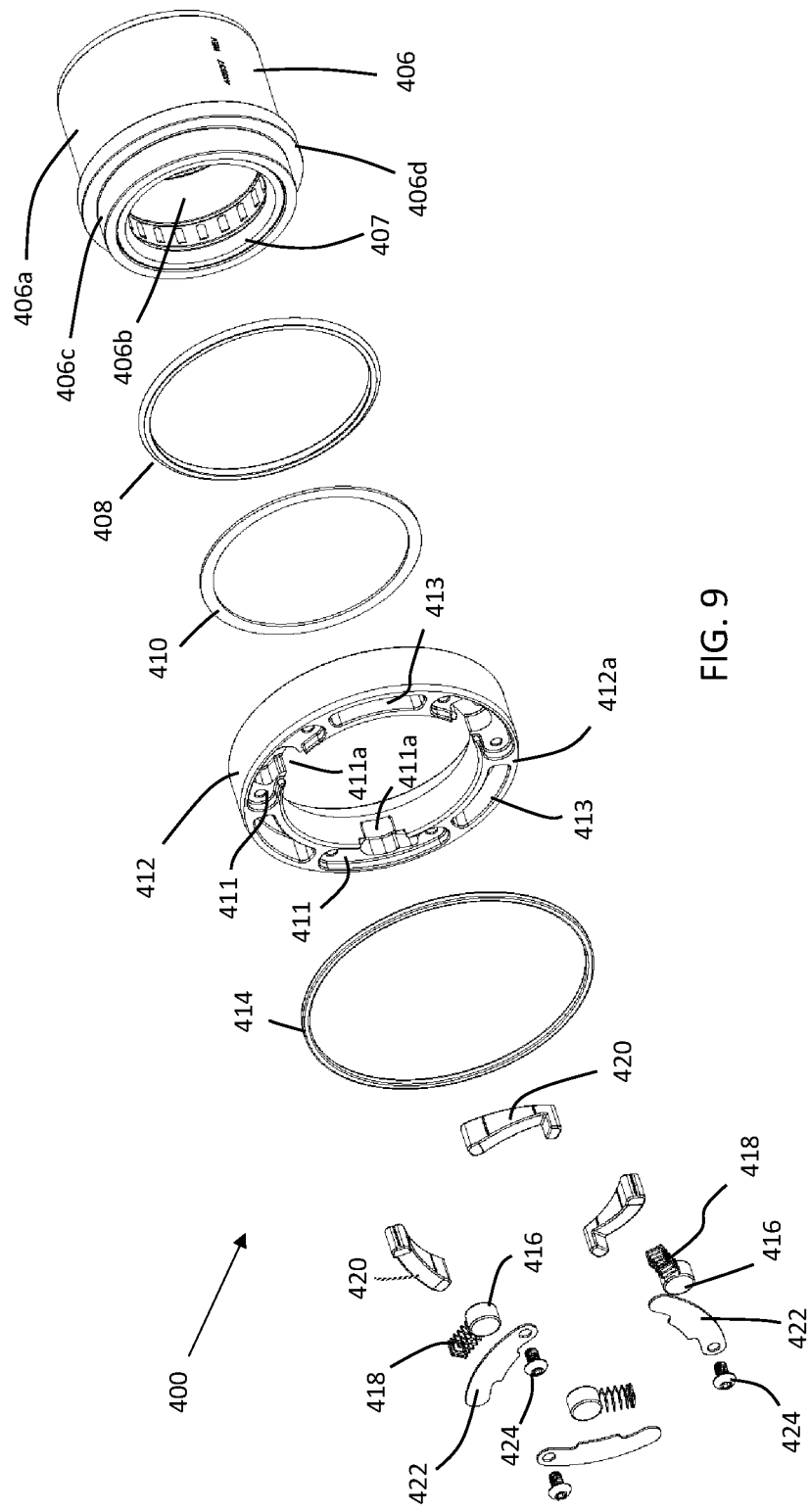
FIG. 9 is an unassembled side view of an engine braking system according to another exemplary embodiment.
Figure 10:
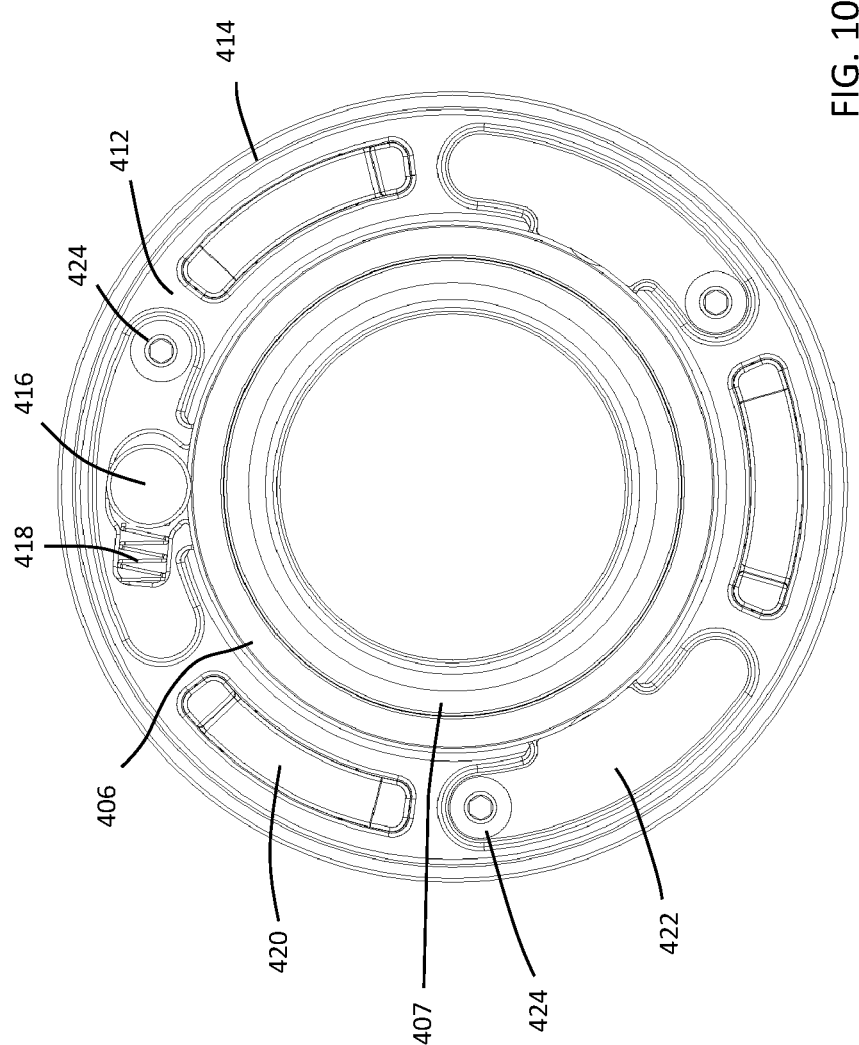
FIG. 10 is an end view of the one-way engagement collar mounted on the sleeve in the engine braking system of FIG. 9.

FIGS. 9 and 10 illustrates yet another example embodiment of an engine braking system 400 that would be included in a drive sheave assembly 100 of a CVT 304 as discussed above. This example embodiment includes a sleeve 406. The sleeve includes an outer surface 406a that is designed to engage in inner surface of a belt, such as belt 200 discussed above and an inner surface 406b. A ridge portion 406d extends from the outer surface 406a of the sleeve 406 that separates the outer surface 406a designed to engage the belt 200 and an end portion 406c of the sleeve 406 designed to engage an inner surface of a one-way engagement collar 412. In this embodiment, the end portion 406c does not include ramps. The outer surface of the end portion 406c is a smooth surface with a consistent diameter.

The one-way engagement collar 412 in this example, includes a plurality of locking pockets 411 extending axially in an end surface 412a of the one-way engagement collar 412. Each locking pocket 411 is configured to receive a locking roller 416 and associated compression spring 418 (roller biasing member 418). Each locking pocket 411 includes a roller window 411a that allows a portion of an associated locking roller 416 to engage the end outer surface 406c of the sleeve 406. The configuration of each locking pocket 411 with its associated locking roller 416 and compression spring 418 allows the one-way engagement collar 412 to rotate freely in relation to the sleeve 406 in a first direction while locking rotation of the one-way engagement collar 412 with the sleeve 406 in a second direction (which would occur in during an engine braking situation). In particular, a cam profile in each locking pocket 411 prevents the locking roller 416 from rotating as it is wedged between the cam profile in its associated locking pocket 411 and the end outer surface 406c of the sleeve 406 during an engine braking situation. Retainer plates 422 and fasteners 424 are used in this example to retain the locking rollers 416 and compression springs 418 within their associated locking pockets 411 in the one-way engagement collar 412.

The one-way engagement collar 412 in this example also includes ramp pockets 413 that are configured to receive ramp members 420. Like ramp members 114 discussed above. The ramp members 420 are configured to engage sheave ramps 105 located within a central recess 103 of a fixed sheave 102. When the one-way engagement collar 412 locks rotation with the sleeve 406 in an engage braking situation, the ramp members 420/engage sheave ramps 105 move the one-way engagement collar 412 to engage a side of the belt to enhance engine braking.

The engine braking system 400 further includes a lip seal 407 to keep grease retained inside a bearing of the sleeve 406 as wells as seals 408 and 414 and thrust washer 410. Seal 414 is positioned between an outer surface of the one-way engagement collar 412 and an interior surface of the central recess of the fixed sleeve in an example embodiment.

EXAMPLE EMBODIMENTS

Example 1 includes a drive sheave assembly of a continuously variable transmission, the drive sheave assembly includes a post, a fixed sheave, a movable sheave, a sleeve, a one-way engagement collar and ramp members. The fixed sheave is statically mounted on the fixed post and includes a central recess. The fixed sheave further includes a plurality of sheave ramps within the central recess. The movable sheave is slidably mounted on the fixed post. The sleeve is rotatably mounted on the post. A mid-portion of the sleeve is positioned between the fixed sheave and the movable sheave and has an outer surface configured to engage an inner surface of a belt. A one-way engagement collar is mounted over an end portion of the sleeve. The one-way engagement collar is configured to rotate freely on the end portion of the sleeve when the sleeve rotates in a first direction and lock onto rotation of the sleeve when the sleeve rotates in a second direction. The one-way engagement collar further has a plurality of ramp pockets that extend axially in from an end surface of the one-way engagement collar. A ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

Example 2 includes the drive sheave assembly of Example 1, further wherein the one-way engagement collar further has a plurality of locking pockets extending axially in from the end surface of the one-way engagement collar. The one-way engagement collar includes a plurality of roller windows. Each roller window extends radially from an inside surface of the one-way engagement collar into an associated locking pocket. A plurality of pairs of locking rollers and roller biasing members are received in an associated locking pocket of the one-way engagement collar. A portion of each locking roller extends through an associated roller window of the one-way engagement collar to engage the end portion of the sleeve. Each locking pocket and associated pair of locking roller and roller biasing member are configured to rotate freely on the end portion of the sleeve when the sleeve rotates in the first direction and lock onto rotation of the sleeve when the sleeve rotates in the second direction.

Example 3 includes the drive sheave assembly of Example 2, further including a plurality or retainer plates and fasteners. Each retaining plate and at least one associated fastener of the plurality or retainer plates and fasteners are configured to cover an associated locking pocket to retain an associated pair of locking roller and roller biasing member within the associated locking pocket.

Example 4 includes the drive sheave assembly of Example 1, further wherein the end portion of the sleeve includes a plurality of sleeve ramps. Each sleeve ramp terminates with a ramp sleeve stop. The one-way engagement collar has a plurality of bullet pockets that extend radially in from an interior surface of the one-way engagement collar.

Example 5 includes the drive sheave assembly of Example 4, further including a plurality of bullets. Each bullet includes a bore. Each bullet further configured to be received within an associated bullet pocket of the plurality of bullet pockets in the one-way engagement collar. A bullet bias member is received in each bore of each bullet to provide a bias force an associated bullet of the plurality of bullets to engage an associated sleeve ramp and ramp sleeve stop of the plurality of the sleeve ramps of the sleeve ramp portions of the sleeve.

Example 6 includes the drive sheave assembly of Example 5, wherein the bullet bias members are configured to provide a select amount of force that can be countered by a defined centrifugal force provided by a rotation rate of the one-way engagement collar.

Example 7 includes the drive sheave assembly of any of the Examples 1-6, further including at least one seal positioned between the sleeve and the one-way engagement collar.

Example 8 includes the drive sheave assembly of any of the Examples 1-7, further including at least one seal positioned between the fixed sheave and the one-way engagement collar.

Example 9 includes the drive sheave assembly of any of the Examples 1-8, further including an engine braking bias member configured to exert an axial force on the one-way engagement member into central recess of the fixed sheave.

Example 10 includes the drive sheave assembly of any of the Examples 1-9, further including an engine braking system that is configured to disengage the one-way engagement collar from the belt when a centrifugal force threshold is reached during an engine braking condition.

Example 11 includes the drive sheave assembly of any of the Examples 1-10, wherein the one-way engagement collar is configured to be received within the central recess of the fixed sheave during non-engine braking conditions and to extend at least partially out of the central recess to engage the side of the belt during an engine braking condition.

Example 12 includes a drive sheave assembly of a continuously variable transmission, the drive sheave assembly includes a post, a fixed sheave, a movable sheave, a sleeve, a one-way engagement collar, a plurality of pairs of locking rollers and roller biasing members, and ramp members. The fixed sheave is statically mounted on the fixed post. The fixed sheave includes a central recess. The fixed sheave further includes a plurality of sheave ramps within the central recess. The movable sheave is slidably mounted on the fixed post. The sleeve is rotatably mounted on the post. A mid-portion of the sleeve is positioned between the fixed sheave and the movable sheave. The mid-portion of the sleeve includes an outer surface configured engage an inner surface of a belt. The one-way engagement collar mounted over an end portion of the sleeve. The one-way engagement collar has a plurality of locking pockets extending axially in from a side edge of the one-way engagement collar. The one-way engagement collar including a plurality of roller windows. Each roller window extending radially from an inside surface of the one-way engagement collar into an associated locking pocket. The one-way engagement collar further having a plurality of ramp pockets that extend axially in from an end surface of the one-way engagement collar. Each pair of locking roller and roller biasing member of the plurality of the locking rollers and roller biasing members received in an associated locking pocket of the one-way engagement collar. A portion of each locking roller extends through an associated roller window of the one-way engagement collar to engage the portion of the sleeve. Each locking pocket and associated pair of locking roller and roller biasing member being configured to allow rotation of the one-way engagement collar on the end portion of the sleeve when the sleeve rotates in a first direction and lock rotation of the one-way engagement collar onto the rotation of the sleeve when the sleeve rotates in a second direction. The ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

Example 13 includes the drive sheave assembly of Example 12, further including a plurality or retainer plates and fasteners. Each retaining plate and at least one associated fastener of the plurality or retainer plates and fasteners are configured to cover an associated locking pocket to retain an associated pair of locking roller and roller biasing member within the associated locking pocket.

Example 14 includes the drive sheave assembly of any of the Examples 12-13, wherein the one-way engagement collar is configured to be received within the central recess of the fixed sheave during non-engine braking conditions and to extend at least partially out of the central recess to engage the side of the belt during an engine braking condition.

Example 15 includes the drive sheave assembly of any of the Examples 12-14, wherein each ramp pocket of the plurality of the ramp pockets includes a cam profile that allows for the rotation of the one-way engagement collar on the end portion of the sleeve when the sleeve rotates in the first direction while locking rotation of the one-way engagement collar onto the rotation of the sleeve when the sleeve rotates in the second direction.

Example 16 includes a vehicle that includes a drivetrain, an engine, and a continuously variable transmission. The continuously variable transmission is in operational communication between the drivetrain and the engine to couple torque between the engine and the drivetrain. The continuously variable transmission includes at least one sheave assembly. The at least one sheave assembly further includes a post a fixed sheave, a movable sheave, a sleeve, a one-way engagement collar, and ramp members. The fixed sheave is statically mounted on the fixed post. The fixed sheave includes a central recess. A plurality of sheave ramps are located within the central recess. The movable sheave is slidably mounted on the fixed post. The sleeve is rotatably mounted on the post. A mid-portion of the sleeve is positioned between the fixed sheave and the movable sheave. The mid-portion of the sleeve has an outer surface that is configured to engage an inner surface of a belt. The one-way engagement collar is mounted over an end portion of the sleeve. The one-way engagement collar is configured to rotate freely on the end portion of the sleeve when the sleeve rotates in a first direction and lock onto rotation of the sleeve when the sleeve rotates in a second direction. The one-way engagement collar further has a plurality of ramp pockets that extend axially in from an end surface of the one-way engagement collar. The ramp member is received within each ramp pocket of the plurality of ramp pockets in the one-way engagement collar. Each ramp member is configured to engage an associated sheave ramp of the plurality of sheave ramps in the central recess of the fixed sheave and move the one-way engagement collar axially to engage a side of the belt when the sleeve rotates in the second direction.

Example 17 includes the vehicle of Example 16, wherein the at least one sheave assembly further wherein the one-way engagement collar further has a plurality of locking pockets extending axially in from the end surface of the one-way engagement collar. The one-way engagement collar includes a plurality of roller windows. Each roller window extends radially from an inside surface of the one-way engagement collar into an associated locking pocket. A plurality of pairs of locking rollers and roller biasing members are included. Each pair of locking roller and roller biasing member of the plurality of the locking rollers and roller biasing members are received in an associated locking pocket of the one-way engagement collar. A portion of each locking roller extends through an associated roller window of the one-way engagement collar to engage the end portion of the sleeve. Each locking pocket and associated pair of locking roller and roller biasing member are configured to rotate freely on the end portion of the sleeve when the sleeve rotates in a first direction and lock onto rotation of the sleeve when the sleeve rotates in a second direction.

Example 18 includes the vehicle of any of the Examples 16-17, further including a plurality or retainer plates and fasteners. Each retaining plate and at least one associated fastener of the plurality or retainer plates and fasteners configured to cover an associated locking pocket to retain an associated pair of locking roller and roller biasing member within the associated locking pocket.

Example 19 includes the vehicle of Examples 16 wherein the end portion of the sleeve of at least one sheave assembly further includes a plurality of sleeve ramps. Each sleeve ramp terminating with a ramp sleeve stop. The one-way engagement collar has a plurality of bullet pockets that extend radially in from an interior surface of the one-way engagement collar.

Example 20 includes the vehicle of Example 19, wherein the at least one sheave assembly further includes a plurality of bullets. Each bullet includes a bore. Each bullet is further configured to be received within an associated bullet pocket of the plurality of bullet pockets in the one-way engagement collar. A bullet bias member is received in each bore of each bullet to provide a bias force on an associated bullet of the plurality of bullets to engage an associated sleeve ramp and ramp sleeve stop of the plurality of the sleeve ramps of the sleeve ramp portions of the sleeve.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A drive sheave assembly of a continuously variable transmission, the drive sheave assembly comprising:
   a post;
   a fixed sheave statically mounted on the post, the fixed sheave including a central recess, the fixed sheave further including a plurality of sheave ramps within the central recess;
   a movable sheave slidably mounted on the post;
   a sleeve rotatably mounted on the post, a mid-portion of the sleeve positioned between the fixed sheave and the movable sheave, the mid-portion of the sleeve having an outer surface configured to engage an inner surface of a belt;
   a one-way engagement collar mounted over an end portion of the sleeve, the one-way engagement collar configured to rotate freely on the end portion of the sleeve when the sleeve rotates in a first direction and lock onto rotation of the sleeve when the sleeve rotates in a second direction, the one-way engagement collar further having a plurality of ramp pockets that extend axially in from an end surface of the one-way engagement collar; and
   a ramp member received within each ramp pocket of the plurality of ramp pockets in the one-way engagement collar, each ramp member configured to engage an associated sheave ramp of the plurality of sheave ramps in the central recess of the fixed sheave and move the one-way engagement collar axially to engage a side of the belt when the sleeve rotates in the second direction.

2. The drive sheave assembly of claim 1, further wherein:
   the one-way engagement collar further having a plurality of locking pockets extending axially in from the end surface of the one-way engagement collar, the one-way engagement collar including a plurality of roller windows, each roller window extending radially from an inside surface of the one-way engagement collar into an associated locking pocket; and
   a plurality of pairs of locking rollers and roller biasing members, each pair of locking roller and roller biasing member of the plurality of the locking rollers and roller biasing members received in an associated locking pocket of the one-way engagement collar wherein a portion of each locking roller extends through an associated roller window of the one-way engagement collar to engage the end portion of the sleeve, each locking pocket and associated pair of locking roller and roller biasing member being configured to rotate freely on the end portion of the sleeve when the sleeve rotates in the first direction and lock onto rotation of the sleeve when the sleeve rotates in the second direction.

3. The drive sheave assembly of claim 2, further comprising:
   a plurality or retainer plates and fasteners, each retaining plate and at least one associated fastener of the plurality or retainer plates and fasteners configured to cover an associated locking pocket to retain an associated pair of locking roller and roller biasing member within the associated locking pocket.

4. The drive sheave assembly of claim 1, further wherein:
   the end portion of the sleeve including a plurality of sleeve ramps, each sleeve ramp terminating with a ramp sleeve stop; and
   the one-way engagement collar having a plurality of bullet pockets that extend radially in from an interior surface of the one-way engagement collar.

5. The drive sheave assembly of claim 4, further comprising:
   a plurality of bullets, each bullet including a bore, each bullet further configured to be received within an associated bullet pocket of the plurality of bullet pockets in the one-way engagement collar; and
   a bullet bias member received in each bore of each bullet to provide a bias force an associated bullet of the plurality of bullets to engage an associated sleeve ramp and ramp sleeve stop of the plurality of the sleeve ramps of the sleeve ramp portions of the sleeve.

6. The drive sheave assembly of claim 5, wherein the bullet bias members are configured to provide a select amount of force that can be countered by a defined centrifugal force provided by a rotation rate of the one-way engagement collar.

7. The drive sheave assembly of claim 1, further comprising:
   at least one seal positioned between the sleeve and the one-way engagement collar.

8. The drive sheave assembly of claim 1, further comprising:
   at least one seal positioned between the fixed sheave and the one-way engagement collar.

9. The drive sheave assembly of claim 1, further comprising:
   an engine braking bias member configured to exert an axial force on the one-way engagement member into central recess of the fixed sheave.

10. The drive sheave assembly of claim 9, further comprising:
    an engine braking system configured to disengage the one-way engagement collar from the belt when a centrifugal force threshold is reached during an engine braking condition.

11. The drive sheave assembly of claim 1, wherein the one-way engagement collar is configured to be received within the central recess of the fixed sheave during non-engine braking conditions and to extend at least partially out of the central recess to engage the side of the belt during an engine braking condition.

12. A drive sheave assembly of a continuously variable transmission, the drive sheave assembly comprising:
    a post;
    a fixed sheave statically mounted on the post, the fixed sheave including a central recess, the fixed sheave further including a plurality of sheave ramps within the central recess;
    a movable sheave slidably mounted on the post;
    a sleeve rotatably mounted on the post, a mid-portion of the sleeve positioned between the fixed sheave and the movable sheave, the mid-portion of the sleeve including an outer surface configured engage an inner surface of a belt;
    a one-way engagement collar mounted over an end portion of the sleeve, the one-way engagement collar having a plurality of locking pockets extending axially in from a side edge of the one-way engagement collar, the one-way engagement collar including a plurality of roller windows, each roller window extending radially from an inside surface of the one-way engagement collar into an associated locking pocket, the one-way engagement collar further having a plurality of ramp pockets that extend axially in from an end surface of the one-way engagement collar;
a plurality of pairs of locking rollers and roller biasing members, each pair of locking roller and roller biasing member of the plurality of the locking rollers and roller biasing members received in an associated locking pocket of the one-way engagement collar wherein a portion of each locking roller extends through an associated roller window of the one-way engagement collar to engage the portion of the sleeve, each locking pocket and associated pair of locking roller and roller biasing member being configured to allow rotation of the one-way engagement collar on the end portion of the sleeve when the sleeve rotates in a first direction and lock rotation of the one-way engagement collar onto the rotation of the sleeve when the sleeve rotates in a second direction; and
a ramp member received within each ramp pocket of the plurality of ramp pockets in the one-way engagement collar, each ramp member configured to engage an associated sheave ramp of the plurality of sheave ramps in the central recess of the fixed sheave and move the one-way engagement collar axially to engage a side of the belt when the sleeve rotates in the second direction.

13. The drive sheave assembly of claim 12, further comprising:
a plurality or retainer plates and fasteners, each retaining plate and at least one associated fastener of the plurality or retainer plates and fasteners configured to cover an associated locking pocket to retain an associated pair of locking roller and roller biasing member within the associated locking pocket.

14. The drive sheave assembly of claim 12, wherein the one-way engagement collar is configured to be received within the central recess of the fixed sheave during non-engine braking conditions and to extend at least partially out of the central recess to engage the side of the belt during an engine braking condition.

15. The drive sheave assembly of claim 12, wherein each ramp pocket of the plurality of the ramp pockets includes a cam profile that allows for the rotation of the one-way engagement collar on the end portion of the sleeve when the sleeve rotates in the first direction while locking rotation of the one-way engagement collar onto the rotation of the sleeve when the sleeve rotates in the second direction.

16. A vehicle comprising:
a drivetrain;
an engine; and
a continuously variable transmission in operational communication between the drivetrain and the engine to couple torque between the engine and the drivetrain, the continuously variable transmission including at least one sheave assembly, the at least one sheave assembly further including,
a post,
a fixed sheave statically mounted on the post, the fixed sheave including a central recess, the fixed sheave further including a plurality of sheave ramps within the central recess;
a movable sheave slidably mounted on the post,
a sleeve rotatably mounted on the post, a mid-portion of the sleeve positioned between the fixed sheave and the movable sheave, the mid-portion of the sleeve having an outer surface configured to engage an inner surface of a belt,
a one-way engagement collar mounted over an end portion of the sleeve, the one-way engagement collar configured to rotate freely on the end portion of the sleeve when the sleeve rotates in a first direction and lock onto rotation of the sleeve when the sleeve rotates in a second direction, the one-way engagement collar further having a plurality of ramp pockets that extend axially in from an end surface of the one-way engagement collar, and
a ramp member received within each ramp pocket of the plurality of ramp pockets in the one-way engagement collar, each ramp member configured to engage an associated sheave ramp of the plurality of sheave ramps in the central recess of the fixed sheave and move the one-way engagement collar axially to engage a side of the belt when the sleeve rotates in the second direction.

17. The vehicle of claim 16, wherein the at least one sheave assembly further comprising:
the one-way engagement collar further having a plurality of locking pockets extending axially in from the end surface of the one-way engagement collar, the one-way engagement collar including a plurality of roller windows, each roller window extending radially from an inside surface of the one-way engagement collar into an associated locking pocket; and
a plurality of pairs of locking rollers and roller biasing members, each pair of locking roller and roller biasing member of the plurality of the locking rollers and roller biasing members received in an associated locking pocket of the one-way engagement collar wherein a portion of each locking roller extends through an associated roller window of the one-way engagement collar to engage the end portion of the sleeve, each locking pocket and associated pair of locking roller and roller biasing member being configured to rotate freely on the end portion of the sleeve when the sleeve rotates in a first direction and lock onto rotation of the sleeve when the sleeve rotates in a second direction.

18. The vehicle of claim 16, wherein the at least one sheave assembly further comprising:
a plurality or retainer plates and fasteners, each retaining plate and at least one associated fastener of the plurality or retainer plates and fasteners configured to cover an associated locking pocket to retain an associated pair of locking roller and roller biasing member within the associated locking pocket.

19. The vehicle of claim 16, wherein the at least one sheave assembly further comprising:
the end portion of the sleeve including a plurality of sleeve ramps, each sleeve ramp terminating with a ramp sleeve stop; and
the one-way engagement collar having a plurality of bullet pockets that extend radially in from an interior surface of the one-way engagement collar.

20. The vehicle of claim 16, wherein the at least one sheave assembly further comprising:
a plurality of bullets, each bullet including a bore, each bullet further configured to be received within an associated bullet pocket of the plurality of bullet pockets in the one-way engagement collar; and a bullet bias member received in each bore of each bullet to provide a bias force on an associated bullet of the plurality of bullets to engage an associated sleeve ramp and ramp sleeve stop of the plurality of the sleeve ramps of the sleeve ramp portions of the sleeve.

\* \* \* \* \*

UNITED STATES PATENT AND TRADEMARK OFFICE
CERTIFICATE OF CORRECTION

PATENT NO. : 11,906,029 B2
APPLICATION NO. : 17/556417
DATED : February 20, 2024
INVENTOR(S) : Eck et al.

Page 1 of 1

It is certified that error appears in the above-identified patent and that said Letters Patent is hereby corrected as shown below:

In the Claims

At Column 13, Line 65, please replace "or" with --of-- between "a plurality" and "retainer plates".

At Column 13, Line 67, please replace "or" with --of-- between "the plurality" and "retainer plates".

At Column 15, Line 34, please replace "or" with --of-- between "a plurality" and "retainer plates".

At Column 15, Line 36, please replace "or" with --of-- between "the plurality" and "retainer plates".

At Column 16, Line 48, please replace "or" with --of-- between "a plurality" and "retainer plates".

At Column 16, Line 50, please replace "or" with --of-- between "the plurality" and "retainer plates".

Signed and Sealed this
Ninth Day of April, 2024

Katherine Kelly Vidal
*Director of the United States Patent and Trademark Office*